Patented Dec. 22, 1936

2,065,126

UNITED STATES PATENT OFFICE 2,065,126

DIATOMACEOUS EARTH PRODUCT

Arthur Fredrik Echberg, Toronto, Ontario, Canada, assignor to John C. K. Stuart, J. W. D. Greig, and W. Reay Featherstone, all of Toronto, Ontario, Canada No Drawing. Application May 2, 1934, Serial No. 723,501. In Canada May 3, 1933

1 Claim. (Cl. 106—18)

Diatomaceous earth which occurs in numerous natural deposits in many parts of the world consists of minute cellular structures which are practically pure silica, and because of their peculiarities of structure and shape, they are, when enmassed a very poor conductor of heat and this quality together with the extreme lightness of weight has made this material extremely desirable as heat insulating media for various purposes, but principally in the walls of furnaces of various kinds, and particularly those where high temperatures are prevalent.

Some of the natural deposits of this form of earth are of such a nature that it may be cut into blocks to render it capable of direct commercial use in the building of wall structures.

Many available deposits of diatomaceous earth are not in such a highly solidified form as to enable the blocks or bricks being cut directly therefrom and when mined the material is more or less broken up.

Many attempts have been made to bind this siliceous material together to form blocks which may be handled commercially without undue loss through breakage and the known methods leave much to be desired.

The principal object of the present invention is to effect the binding together of particles of diatomaceous earth in a manner which will be quite practical and which will produce blocks or bricks which may be handled in the ordinary manner of such products without undue fracture.

A further and important object is to devise a process of treatment of diatomaceous earth which, while being effective will be economical and enable the production of blocks of insulating materials with extremely high resistance.

The principal feature of the invention consists in the novel admixture of material and the method of compounding same, whereby the diatomaceous particles are bound together and reinforced to form a substantial block.

In carrying this process into effect the diatomaceous earth to be used is preferably calcined to remove any foreign matter therefrom, such as oxidizable plants or minerals, and it is then suitably pulverized. Furnace slag, which is first treated to remove moisture, unless taken directly from the furnace, is reduced to a fine state, preferably such as will pass through a screen of about eighty mesh, and with the pulverized slag is mixed a quantity of from five to ten percent of carbonate of lime, the percentage varying in proportion to the sulphur content of the slag.

The mixture of granulated slag and carbonate of lime is then mixed with the calcined pulverized diatomaceous earth in proportion of about ten to fifteen percent of slag.

During the admixture of the above ingredients a quantity, of approximately five percent of the total mass, of sodium chloride is added.

When a thorough mechanical mix has been achieved water with glucose in proportion of about two and one half percent of the mass is added and the whole is mixed until it reaches a cohesive or compressive state. The material is then pressed to the desired shape and size in suitable molds. The formed blocks are then stacked in a suitable kiln and subjected to the action of steam heat under approximately one hundred pounds pressure for a period of about eight hours.

The effect of the applied steam heat is to create such a chemical reaction between the carbonate of lime, sodium chloride and the slag mixed throughout the mass, as to create throughout the entire structure of the blocks, a bond which will effectively support the structure from disintegration with normal handling.

The blocks when thus steam treated are removed from the kiln and are then subjected to a dry furnace heat to drive the moisture therefrom.

In the manufacture of diatomaceous bricks it has been proposed to mix with the pulverized earth a quantity of fibrous material such as asbestos, and it will be understood that asbestos material can be added to the mixture and compound herein described without department from the spirit of the invention.

What I claim is:—

A diatomaceous earth product formed from a mixture containing substantially 80 to 85 parts diatomaceous earth, 5 parts sodium chloride, 2½ parts glucose, and 15 to 10 parts of a mixture of 90 to 95 parts of pulverized slag and 10 to 5 parts of carbonate of lime.

ARTHUR FREDRIK ECHBERG.